United States Patent [19]

Watanabe et al.

[11] Patent Number: 5,304,235
[45] Date of Patent: Apr. 19, 1994

[54] CANISTER

[75] Inventors: Hideo Watanabe; Masatoshi Udagawa; Naritoshi Muramatsu; Hideki Hoshino; Kazumi Yamazaki; Hideo Moriwaki, all of Wako; Atsushi Suzuki, Hamamatsu; Tsutomu Mori, Tenryu; Takenori Suzuki, Hamamatu, all of Japan

[73] Assignees: Toyo Roki Seizo Kabushikikaisha, Shizuoka; Honda Giken Kogyo Kabusiki Kaisha, Tokyo, both of Japan

[21] Appl. No.: 862,460

[22] Filed: Apr. 2, 1992

[30] Foreign Application Priority Data

| Apr. 4, 1991 | [JP] | Japan | 3-021609[U] |
| Apr. 4, 1991 | [JP] | Japan | 3-021610[U] |
| Apr. 4, 1991 | [JP] | Japan | 3-021611[U] |
| Dec. 28, 1991 | [JP] | Japan | 3-113447[U] |
| Dec. 28, 1991 | [JP] | Japan | 3-113448[U] |

[51] Int. Cl.$^5$ .............................. B01D 53/04
[52] U.S. Cl. ..................... 96/144; 96/134; 96/147; 123/519
[58] Field of Search .................. 55/316, 387; 123/518-521

[56] References Cited

U.S. PATENT DOCUMENTS 4,714,485 12/1987 Covert et al. .................. 55/189
5,119,791 6/1992 Gifford et al. .................. 55/387

Primary Examiner—Charles Hart
Attorney, Agent, or Firm—Graham & James

[57] ABSTRACT

A canister includes a casing, a fuel reserve well defined at the bottom of the casing, an adsorbent layer provided in the casing for adsorbing fuel vapor, the adsorbent layer communicating with the fuel reserve well at a region of its lower portion and communicating with an atmosphere at its upper portion, a first communication passage defined so that the fuel reserve well communicates with a fuel system of an engine, and a second communication passage defined so that the fuel reserve well communicates with an intake system of the engine. The second communication passage includes a purge chamber communicating with a region of the adsorbent layer other than the region of the adsorbent layer with which the fuel reserve well communicates, a first fuel outflow passage having a liquid fuel suction port open to the bottom of the fuel reserve well at its lower portion and a nozzle opening positioned in the purge chamber at its upper portion, and a second fuel outflow passage defined over the nozzle opening of the first fuel outflow passage for providing a fuel flow passage extending from the purge chamber to the suction system of the engine.

10 Claims, 10 Drawing Sheets

1

CANISTER

BACKGROUND OF THE INVENTION

This invention relates to a canister catching fuel vapor produced in a fuel system to prevent direct radiation of the fuel vapor into an atmosphere, and more particularly to such a canister having a liquid fuel reserve well formed at the bottom of a casing thereof for separating and preserving liquid fuel.

In a canister, fuel vapor produced in a fuel tank or a carburetor is caught by an adsorbent such as activated carbon while the gasified fuel components are removed from the adsorbent during the running of an engine by passing a sucked atmosphere through the adsorbent, thereby feeding the removed fuel components to the engine with the atmosphere.

Japanese Laid open Patent Application (Kokai) No. 62265460 (1987) discloses one of conventional canisters, as shown in FIG. 10. Referring to FIG. 10, a cylindrical casing 1 of the canister has a fuel reserve well 3 at the bottom. The casing interior over the fuel reserve well 3 is filled with activated carbon 2. A fuel inflow pipe 4 and a fuel outflow pipe 5 both formed into a double pipe are extended through the layer of the activated carbon 2 along the central axis of the casing 1. The fuel inflow pipe 4 has a fuel intake port 6 at the portion thereof extending into the fuel reserve well 3. The fuel outflow pipe 5 has a fuel vapor outlet 7 at the portion thereof extending into the fuel reserve well 3. The fuel vapor outlet 7 communicates with the fuel inflow pipe 4. The fuel outflow pipe 5 further has a liquid fuel outlet 8 positioned below the fuel vapor outlet 7 in the fuel reserve well 3.

A communication port 9 communicating with the atmosphere is provided at the top of the casing 1. A pipe (not shown) is connected to the upper end of the fuel inflow pipe 4 so that it is communicated to an upper interior space of a fuel tank. Another pipe (not shown) is connected to the upper end of the fuel outflow pipe 5 so that it is communicated to an air intake system of the engine.

In accordance with the above-described construction, the fuel vapor in the fuel tank flows into the fuel reserve well 3 through the fuel inflow pipe 4 and the fuel intake port 6. The fuel vapor is adsorbed into the activated carbon 2 and only the air is radiated into the atmosphere through the communication port 9.

On the other hand, the atmosphere is sucked into the casing 1 through the communication port 9 by the action of negative pressure from the engine during its running. The fuel vapor is removed from the activated carbon 2 when the atmosphere passes through the layer of the activated carbon 2. Subsequently, the atmosphere flows into the fuel outflow pipe 5 through the fuel vapor outlet 7 together with the fuel vapor, further flowing to the intake system of the engine. The liquid fuel is also fed to be reserved in the fuel reserve well 3. The reserved liquid fuel is sucked into the fuel outflow pipe 5 through the liquid fuel outlet 8 to be further sucked into the intake system together with the fuel vapor.

In the above-described conventional canister, it is difficult to control a quantity of the liquid fuel sucked from that reserved in the fuel reserve well by the action of the negative pressure from the engine. For example, a quantity of liquid fuel reserved in the fuel reserve well is all sucked in even when it is desirable to maintain at a predetermined range a ratio of the atmosphere and the fuel vapor sucked in through the fuel inflow pipe. Consequently, the density of the fuel vapor is increased too much, resulting in a problem in the fuel control.

In particular, only the liquid fuel is sucked in through the fuel outflow pipe 5 to be thereby fed to the engine immediately when a large quantity of liquid fuel is reserved in the fuel reserve well such that the liquid fuel surface rises over both of the fuel vapor outlet 7 and the liquid fuel outlet 8 in the fuel reserve well. As a result, both of the outlets 7, 8 are closed by the liquid fuel in the fuel reserve well, resulting in an excessive increase in the fuel vapor density. For example, when an automobile runs a relatively short distance, the fuel reserve well is filled with the liquid fuel such that the liquid fuel surface rises over both outlets 7, 8.

SUMMARY OF THE INVENTION

Therefore, an object of the present invention is to provide a canister wherein the suction rate of the fuel vapor can be readily controlled.

In one aspect, the present invention provides a canister comprising a casing, a fuel reserve well defined in the bottom of the casing, an adsorbent layer provided in the casing for adsorbing fuel vapor, the adsorbent layer communicating with the fuel reserve well at the lower portion thereof and with an atmosphere at the upper portion thereof, a first communication passage provided so that the fuel reserve well communicates with a fuel system of an engine therethrough, and a second communication passage provided so that the fuel reserve well communicates with an intake system of the engine, the second communication passage including a purge chamber communicating with a region of the adsorbent layer other than the region of the adsorbent layer communicating with the fuel reserve well, a first fuel outflow passage having a liquid fuel suction port open to the bottom of the fuel reserve well at the lower portion thereof and a nozzle opening positioned in the purge chamber at the upper portion thereof, and a second fuel outflow passage provided over the nozzle opening of the first fuel outflow passage for providing a fuel flow passage extending from the purge chamber to the suction system of the engine.

The purge chamber may also be formed so as to communicate with a region of the underside of the adsorbent layer other than the region thereof with which the fuel reserve well communicates.

The fuel vapor produced in the fuel storage system flows into the fuel reserve well through the first communication passage and then, flows into the adsorbent layer to be adsorbed by the adsorbent layer. The liquid fuel is reserved in the fuel reserve well.

On the other hand, the negative pressure acts on the underside of the adsorbent layer through the second communication passage during the running of the engine and accordingly, the atmosphere is sucked from the upper surface of the adsorbent layer. The fuel vapor is removed from the adsorbent layer when the atmosphere passes through the adsorbent layer. Subsequently, the atmosphere containing the fuel vapor flows into the purge chamber and is further sucked into the intake system of the engine through the second fuel outflow passage When the atmosphere passes through a passage from the purge chamber to the second fuel outflow passage, the negative pressure arises at the nozzle opening of the first fuel outflow passage facing the passage. Since the lower end of the first fuel outflow passage is open at the bottom of the fuel reserve well, the liquid fuel, when reserved in the fuel reserve well, is sucked to the nozzle opening according to the negative pressure. The liquid fuel is sprayed from the nozzle opening into the second fuel outflow passage and then sucked into the intake system of the engine. A quantity of the liquid fuel sprayed from the nozzle opening can be set to a desirable value by changing the diameter of the nozzle opening or the configuration of the suction passage.

In accordance with the above-described canister, the liquid fuel is sprayed and then sucked into the intake system, the fuel is not rapidly supplied to the intake system. Consequently, the fuel control can be readily performed. Furthermore, the fuel control is not influenced by the quantity of the sucked fuel since the quantity of the sucked fuel can be adjusted by changing the diameter of the nozzle opening or the configuration of the suction passage. For example, since the fuel consumption is generally small during the low speed rotation, the quantity of the supplied fuel is prevented from being varied by reducing the quantity of liquid fuel. On the other hand, when the fuel consumption is generally large during the high speed rotation, the liquid fuel is sprayed to be supplied to the intake system. Consequently, the fuel control can be performed satisfactorily.

The negative pressure is exerted on the second communication passage during the running of the engine. The second communication passage communicates with the fuel reserve well through the first fuel outflow passage having the nozzle opening. Accordingly, a suction force due to the negative pressure acts on the underside of the adsorbent layer in the purge chamber to which the second fuel outflow passage is open, resulting in suction of the atmosphere. Since the region of the adsorbent layer underside communicating with the purge chamber is independent of its region communicating with the fuel reserve well, the fuel vapor flowing into the fuel reserve well through the first communication passage further flows into the adsorbent layer through the region of its underside the fuel reserve well faces. The fuel vapor then flows into the purge chamber through the region of the adsorbent layer underside the purge chamber faces. That is, the fuel vapor cannot enter the purge chamber without passing through the adsorbent layer once. Consequently, since the fuel vapor removed from the adsorbent layer by the atmosphere is fed to the intake system, the fuel can be supplied in a combustible state.

The purge chamber may also be formed so as to communicate with a region of the underside of the adsorbent layer other than the region thereof with which the fuel reserve well communicates and further, the second fuel feed passage may be formed so as to vertically extend through the adsorbent layer. In this case, particularly, the fuel reserve well is formed at the bottom of the casing. The first fuel feed passage is provided so that its lower end is positioned in the fuel reserve well and its upper end is positioned in the purge chamber. The purge chamber is provided so as to communicate with the adsorbent layer and the second fuel feed passage extending vertically is connected to the purge chamber. Thus, assembly of the canister progresses in the vertical direction of the casing and accordingly, the parts can be readily mounted in the casing.

Furthermore, it is preferable that the first communication passage be formed so as to communicate with the fuel reserve well at the lower side of the casing, that the fuel reserve well communicate with a generally central portion of the adsorbent layer at the underside thereof, that the purge chamber be formed so as to communicate with a peripheral region of the adsorbent layer other than a region to which the portion communicating with the fuel reserve well belongs, and that the second fuel outflow passage be formed so as to extend from the purge chamber to the bottom of the casing. In this case the adsorbent layer is provided in the upper interior of the casing and the communication passages are formed at the bottom of the casing. Accordingly, the assembly of the canister is initiated at the bottom portion of the casing and then, the upper interior of the casing is filled with the adsorbent layer. Thus, the assembly can be readily performed.

Furthermore, the fuel vapor invades the adsorbent layer from the central underside region thereof and is removed from the adsorbent layer through the peripheral region thereof. Consequently, the fuel vapor can be prevented from flowing directly from the fuel storage system to the intake system and the flow of fuel vapor is formed in the adsorbent layer, resulting in effective use of the adsorbent layer.

In another aspect, the invention provides a canister comprising a casing, a fuel reserve well defined in the bottom of the casing, an adsorbent layer provided in the casing for adsorbing fuel vapor, the fuel reserve well communicating with a region of the lower portion of the adsorbent layer, the adsorbent layer communicating with an atmosphere at the upper portion thereof, a third communication passage provided so that the fuel reserve well communicates with a fuel system of an engine therethrough, and a fourth communication passage communicating with a region of the lower side of the adsorbent layer other than the region of the adsorbent layer with which the fuel reserve well communicates, thereby providing a fuel flow passage extending to an intake system of an engine.

In accordance with the above-described canister, the fuel vapor produced in the fuel storage system always passes through the adsorbent layer having a predetermined thickness before sucked into the intake system. Consequently, the variations in the density of the fuel vapor can be reduced, resulting in simplification of the engine control.

In further another aspect, the invention provides a canister comprising a casing, a fuel reserve well defined in the bottom of the casing, an adsorbent layer provided in the casing for adsorbing fuel vapor, the adsorbent layer communicating with the fuel reserve well at the lower portion thereof and with an atmosphere at the upper portion thereof, and a trap plate provided to partition the interior of the fuel reserve well into upper and lower chambers, the trap plate having a number of communication holes communicating between the upper and lower chambers.

In accordance with the above-described canister, the liquid fuel reserved in the fuel reserve well can be prevented from invading the adsorbent layer when splashed by vibration of the engine or the like. Furthermore, the fuel vapor adsorbing and removing performance of the adsorbent can be maintained properly for a long period of time. Additionally, the canister can be formed into a compact size since the ceiling of the fuel reserve well need not be increased high.

Other objects of the present invention will become obvious upon understanding of the illustrative embodiments about to be described. Various advantages not referred to herein will occur to one skilled in the art upon employment of the invention in practice.

BRIEF DESCRIPTION OF THE DRAWINGS

The embodiments of the present invention will be described with reference to the accompanying drawings in which.

DESCRIPTION OF THE PREFERRED EMBODIMENTS

Figure 1:
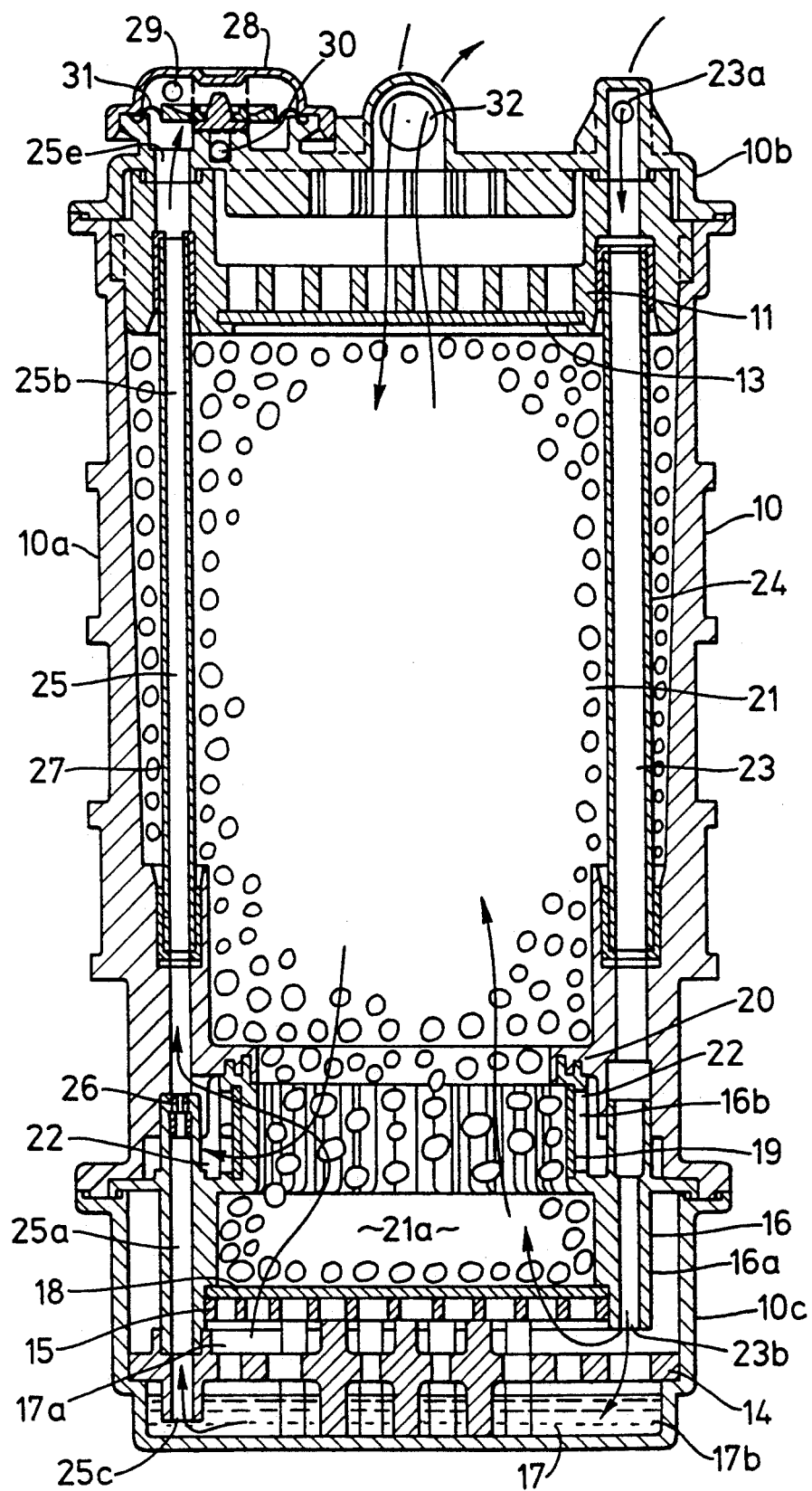
FIG. 1 is a longitudinal sectional view of the canister in accordance with one embodiment of the present invention.
Figure 2:
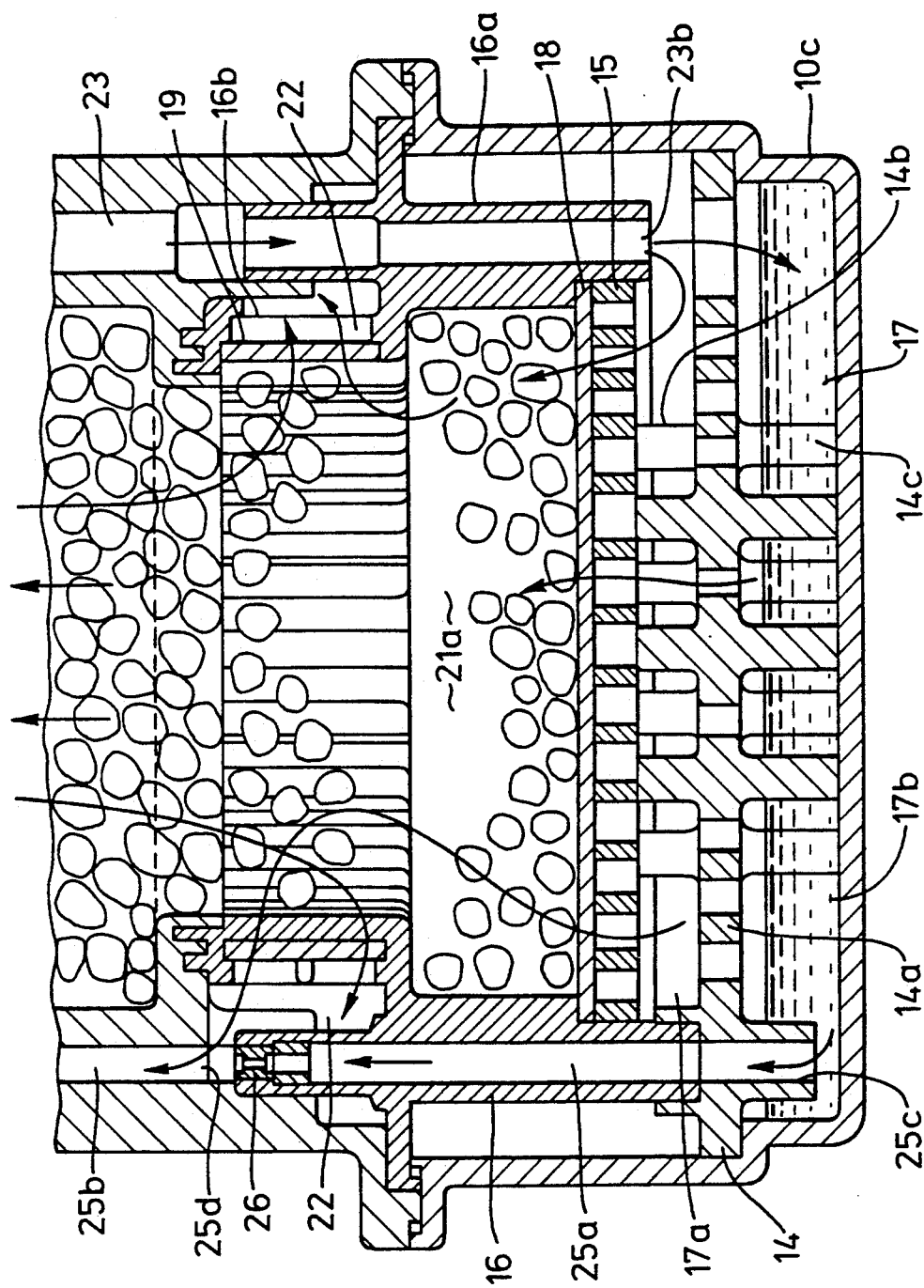
FIG. 2 is an partially enlarged longitudinal sectional view of the lower portion of the canister.

A first embodiment of the present invention will be described with reference to FIGS. 1 through 4. Referring to FIGS. 1 and 2, a casing 10 of the canister in accordance with the first embodiment of the invention comprises a vertical cylindrical portion 10a, an upper lid 10b closing the open top of the cylindrical portion 10a, and a lower lid 10c closing the open bottom of the cylindrical portion 10a. A lattice member 11 is held between the cylindrical portion 10a and the upper lid 10b. Filters 13 are attached to upper and lower sides of the lattice member 11 respectively for preventing an adsorbent from leaking out of the cylindrical member 10a, as will be described in detail later. The lower lid 10c is generally formed into the shape of a relatively deep vessel. A trap plate 14, a first lower lattice member 15 and a second lower lattice member 16 are inserted into the lower lid 10c in turn from the bottom thereof. The trap plate 14 is mounted on upper and lower sides of a lattice plate 14a integrally with it. The trap plate 14 has columns 14b and 14c in contact with face plates of the first lower lattice member 15 and the lower lid 10c respectively. The lattice plate 14a has a number of holes vertically extending therethrough so that liquid fuel flowing into the casing 10 drops through the holes from the upper side of the lattice plate 14a to the lower side thereof while fuel vapor passes through the holes from the lower side of the lattice plate 14a to the upper side thereof. The columns 14b, 14c may or may not be provided.

A cavity is defined between the first lower lattice member 15 and the face plate of the lower lid 10c and the trap plate 14 is enclosed in the cavity. This cavity serves as a fuel reserve well 17. Fuel fed from the fuel system such as a fuel tank is reserved in the fuel reserve well 17, as will be described later. The fuel reserve well 17 is partitioned by the lattice plate 14a of the trap plate 14 into upper and lower chambers. The lower chamber serves as reserve chamber 17a for reserving the liquid fuel and the upper chamber serves as an inflow chamber 17b into which the fuel vapor flows. Although the liquid fuel is caused to splash in the reserve chamber 17a, it is prevented by the lattice plate 14a from splashing over the plate. Furthermore, although the liquid fuel surface is raised over the lattice plate 14a, an excessive vibration of the liquid fuel surface is prevented by the lattice plate 14a.

The second lower lattice member 16 comprises a cylindrical portion 16a inserted into the interior of the lower lid 10c and a lattice portion 16b provided over the lower lid 10c and inserted into the cylindrical portion 16a. The first lower lattice member 15 is attached to the lower portion of the cylindrical portion 16a. A filter 18 preventing the adsorbent from leaking out of the casing 10 is held between the first lattice member 15 and the lower portion of the cylindrical portion 16a. The lattice portion 16b is formed into the shape of a cylinder having a diameter larger than the cylindrical portion 10a and has a number of lattice openings formed in the cylindrical peripheral wall thereof. An annular filter 19 is attached to the outer periphery thereof for preventing leakage of the adsorbent which will be described later. The upper edge of the lattice portion 16b is fitted with an annular projection 20 formed along the circumference of the cylindrical portion 10a so that the leakage of the adsorbent is prevented.

A generally columnar chamber is defined between the upper lid side filter 13 and the lower lid side filter 18 in the interior of the cylindrical portion 10a of the casing 10. The columnar chamber is filled with an adsorbent 21 such as activated carbon for adsorbing fuel such as gasoline. An annular cavity 22 is defined between the lattice portion 16b of the second lower lattice member 16 and the inner peripheral wall surface of the cylindrical portion 10a. The annular cavity 22 is isolated from the fuel reserve well 17 by an adsorbent layer 21a having a predetermined thickness.

A pipe 24 is provided longitudinally along the inner peripheral wall of the casing 10 to define therein a fuel inflow passage 23. An inlet 23a of the fuel inflow passage 23 is provided in the upper lid 10b. A pipe extending from the fuel tank or the like is adapted to be connected to the inlet 23a. The fuel inflow passage 23 extends from the inlet 23a downwardly through the thick wall portion of the upper lattice member 11, whereby the fuel vapor or the liquid fuel from the fuel tank or the like flows into the fuel reserve well 17 through the fuel inflow passage 23. The fuel vapor further flows into the adsorbent layer 21 through the trap plate 14 and the first lower lattice member 15. The fuel vapor is adsorbed by the adsorbent layer 21 while upwardly passing through the adsorbent layer 21. The liquid fuel is reserved below the trap plate 14 in the fuel reserve well 17.

Another pipe 27 is provided longitudinally along the inner peripheral wall of the casing away from the pipe 24 to define therein a fuel outflow passage 25. The fuel outflow passage 25 is divided into a lower first fuel outflow passage 25a and an upper second fuel outflow passage 25b. The lower ends of both passages 25a, 25b serve as first and second inlets 25c and 25d respectively. The first inlet 25c is formed integrally with the trap plate 14 and open to the interior of the fuel reserve well 17 below the trap plate 14. The first fuel outflow passage 25a extends from the first inlet 25c upwardly through the thick wall portion of the cylindrical portion 16a of the lower lattice member 16, communicating with the annular chamber 22. A jet 26 is mounted on the portion of the first fuel outflow passage 25a where it communicates with the annular chamber 22.

The second inlet 25d faces the annular chamber 22 so that the fuel vapor passing through the annular chamber 22 flows into the second inlet 25d. The second fuel feed passage 25b extends from the second inlet 25d upwardly through the thick wall portion of the cylindrical portion 10a. The second fuel feed passage 25b further extends upwardly through the thick wall portion of the upper lattice member 11, terminating at an outlet 25e provided in the upper lid 10b. The second inlet 25d is opposite to the jet 26 with a predetermined distance therebetween so that the liquid fuel is sprayed from the jet 26 by the flow of fuel vapor flowing into the inlet 25d. The diameter of the jet 26 is determined so that spraying is initiated when the rate of flow of air passing ahead of it reaches a predetermined value. The rate of flow of air is 16 lit./min., for example.

A diaphragm valve 28 is mounted at the outlet 25e of the second fuel outflow passage 25b for opening and closing the outlet 25e. An upper chamber of the diaphragm valve 28 has an aperture communicating with the engine main body side. A valve seat surrounding a discharge opening 30 is provided in a lower chamber of the diaphragm valve 28. A valve element mounted on a diaphragm 31 is departed from the valve seat when the negative pressure is exerted on the diaphragm valve 28 from the engine main body side, thereby opening the flow passage to the discharge opening 30. The valve element is brought into contact with the valve seat upon release of the negative pressure. An atmosphere guide port 32 is provided in the central portion of the upper lid 10b of the casing 10 for guiding an atmosphere into the casing 10 when the fuel is fed out through the fuel outflow passage 25.

The operation of the canister thus constructed will be described along the flow of fuel. During stop of the engine, the fuel vapor from the fuel tank or the carburetor flows downwardly through the inlet 23a, entering the fuel reserve well 17. The fuel vapor then passes upwardly through the first lower lattice member 15 and the filter 18 and rises in the adsorbent layer 21. The fuel vapor is adsorbed by the adsorbent layer 21 while it is rising in the adsorbent layer 21. Consequently, the fuel vapor produced in the fuel tank or the like is prevented from being dissipated into the atmosphere.

During running of the engine, open air is sucked into the casing 10 through the atmosphere guide port 32 by the action of the negative pressure periodically produced in the engine main body side. The open air passes downwardly through the adsorbent layer 21 such that the fuel vapor adsorbed by the adsorbent layer 21 is removed therefrom and enters the cavity 22 with the removed fuel vapor. The open air with the fuel vapor then enters the second fuel outflow passage 25b through the second inlet 25d facing the cavity 22 and passes upwardly through the second fuel outflow passage 25b, flowing to the cylinders of the engine through the outlet 25e which is opened by the diaphragm valve 28.

The fuel vapor and liquid fuel also enter the fuel reserve well 17 through the fuel inflow passage 23 during the period of occurrence of the above-described negative pressure. The fuel vapor then passes upwardly through the first lower lattice member 15 and the filter 18, entering the adsorbent layer 21. The fuel vapor then enters the cavity 22 through the adsorbent layer 21a having the predetermined thickness. A certain volume of the fuel vapor is adsorbed by the adsorbent layer 21a and the remaining fuel vapor enters the cavity 22. The remaining fuel vapor meets the fuel vapor removed from the upper adsorbent layer 21 at the second inlet 25d, flowing upwardly through the second fuel outflow passage 25b. Consequently, the density of the fuel fed to the engine main body side can be prevented from being increased.

Figure 3:
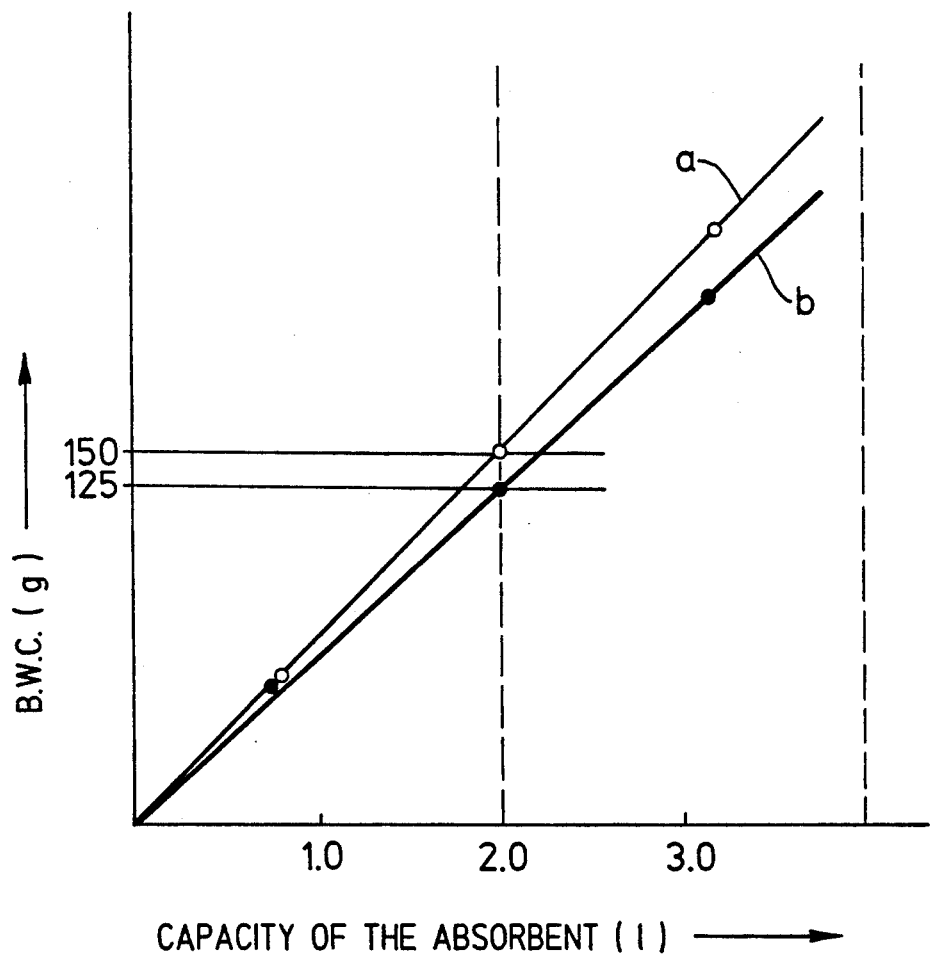
FIG. 3 is a graph showing the relation between the capacity of the adsorbent and B. W. C.

On the other hand, the liquid fuel is reserved below the trap plate 14 in the fuel reserve well 17. The first inlet 25c sinks under the fuel liquid surface when a predetermined quantity of liquid fuel is reserved in the fuel reserve well 17. Although the liquid fuel is caused to splash in the reserve chamber 17a, it is prevented by the lattice plate 14a from splashing over the plate. Furthermore, although the liquid fuel surface is raised over the lattice plate 14a, an excessive vibration of the liquid fuel surface is prevented by the lattice plate 14a. Consequently, the adsorbing and removing capability of the adsorbent is prevented from being reduced by the liquid fuel since the liquid fuel does not reach the filter 18 or the adsorbent layer 21. FIG. 3 shows the normal butane adsorbing and removing capability in the case of the canister having the conventionally constructed fuel reserve well, as presented by line (a) and that in the case of the canister constructed in accordance with the present invention, as presented by line (b). For example, when the capacity of the adsorbent is 2 litters, the capability is 150 grams in the conventional construction while it is 125 grams in the present invention. The capability is thus improved to a large extent.

A negative pressure arises in the jet 26 when the fuel vapor flows into the second inlet 25d with flow of air. As a result, the liquid fuel reserved in the fuel reserve well 17 is caused to flow upwardly through the first inlet 25c and the first fuel outflow passage 25a. The liquid fuel is then sprayed from the jet 26 and flows into the second fuel outflow passage 25b with the above-described fuel vapor. The jet 26 is operated when the flow rate of the fuel vapor flowing into the second inlet 25d reaches a predetermined value such as 16 lit./min.

Figure 4:
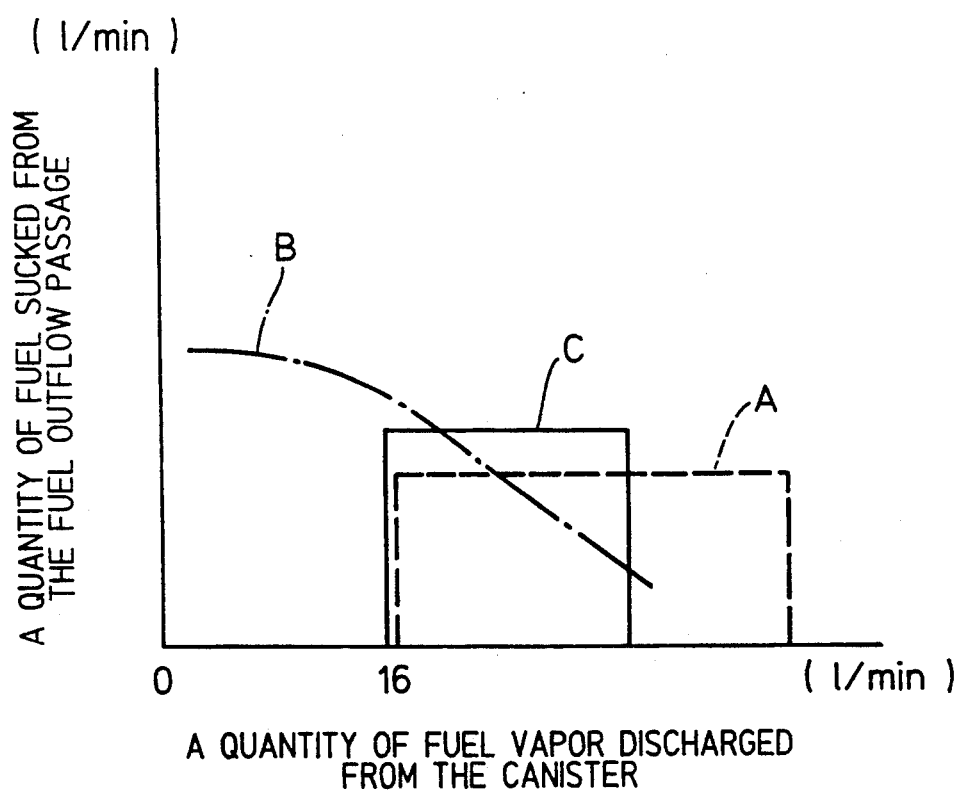
FIG. 4 is a graph showing controlled volume of gasoline.
Figure 10:
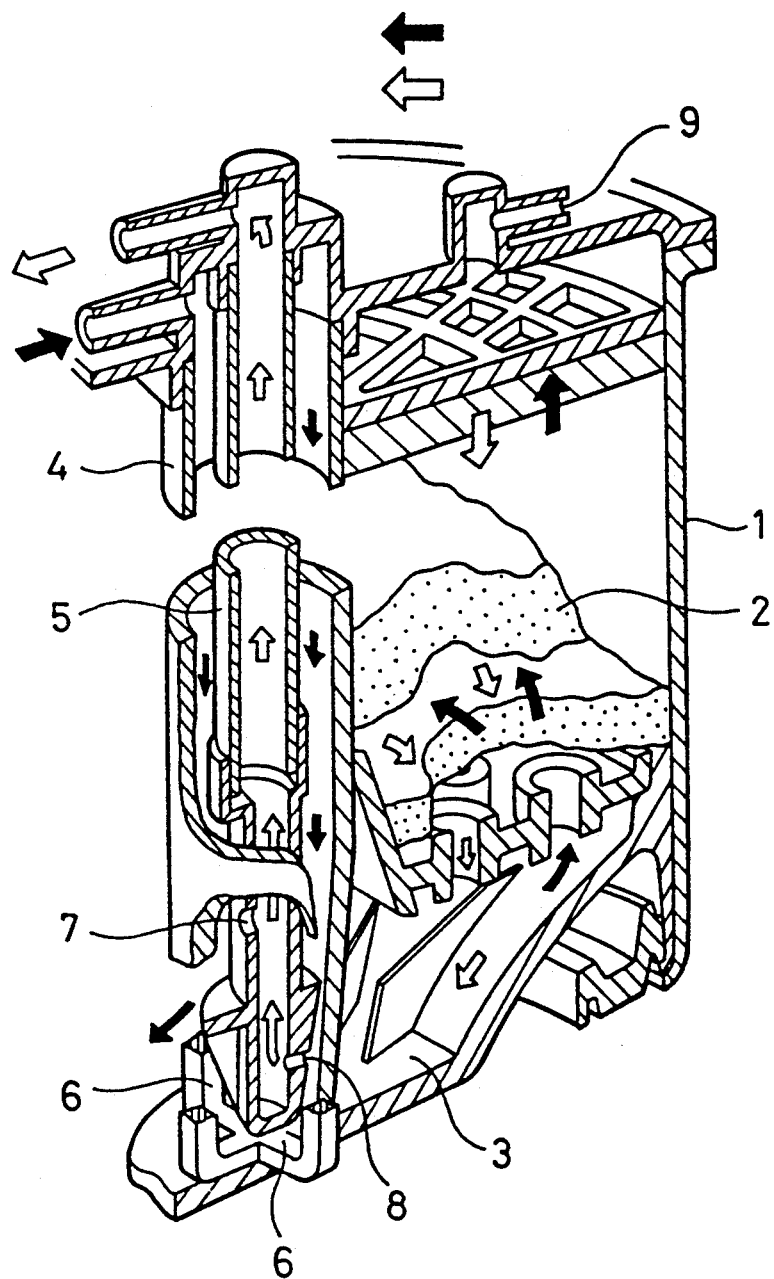
FIG. 10 is a partially perspective view partly in the longitudinal section of a conventional canister.

FIG. 4 shows a quantity of fuel sucked from the fuel outflow passage. Line A in FIG. 4 represents a desired case where the quantity of liquid fuel discharged from the fuel outflow passage rapidly rises when the flow rate of the fuel vapor discharged from the canister reaches a predetermined value and then, it rapidly reduces after maintaining the rapidly increased value for a while. When the surface of the liquid fuel reserved in the fuel reserve well exceeds both of the fuel vapor outlet 7 and the liquid fuel outlet 8 in the conventional canister shown in FIG. 10, the quantity of the liquid fuel discharged from the canister rapidly rises at an initial stage of running of the engine and reduces with the increase in the flow rate of the fuel vapor discharged from the canister, as shown by line B. Accordingly, the quantity of liquid fuel can become null when the quantity of liquid fuel reserved in the fuel reserve well is small. As a result, the quantity of fuel supplied to the engine during the period of low speed rotation fluctuates to a large extent, resulting in difficulty in the fuel control In the canister of the embodiment, however, the quantity of fuel discharged from the canister rapidly rises when the rotational speed is increased to a certain value, as shown by line C and accordingly, the relation as represented by the desired case can be obtained. Additionally, the quantity of the liquid fuel can be adjusted by changing the diameter of the jet 26.

In accordance with the above-described embodiment, both of the inlets of the respective fuel outflow passages are not simultaneously closed with the upper inlet being always opened even when the fuel reserve well is filled up with the liquid fuel. Consequently, the fuel vapor can be removed from the adsorbent even when the fuel reserve well is filled up with the liquid fuel and accordingly, the fuel vapor with low density can be fed to the engine.

Furthermore, the density of the fuel vapor can be properly controlled since the liquid fuel can be fed from the jet to the flow of fuel vapor when the flow rate of the fuel vapor passing ahead o f the j e t reaches the predetermined value. Particularly, since the liquid fuel is sprayed from the jet, the flow of fuel vapor can be unified, which is suitable for the combustion control of the engine.

Additionally, the liquid fuel can be prevented from flowing into the adsorbent even when the vibration of the engine or the like causes it to splash in the fuel reserve well. As a result, the fuel vapor adsorbing and removing capability of the adsorbent can be maintained properly for a long period of time.

Figure 5:
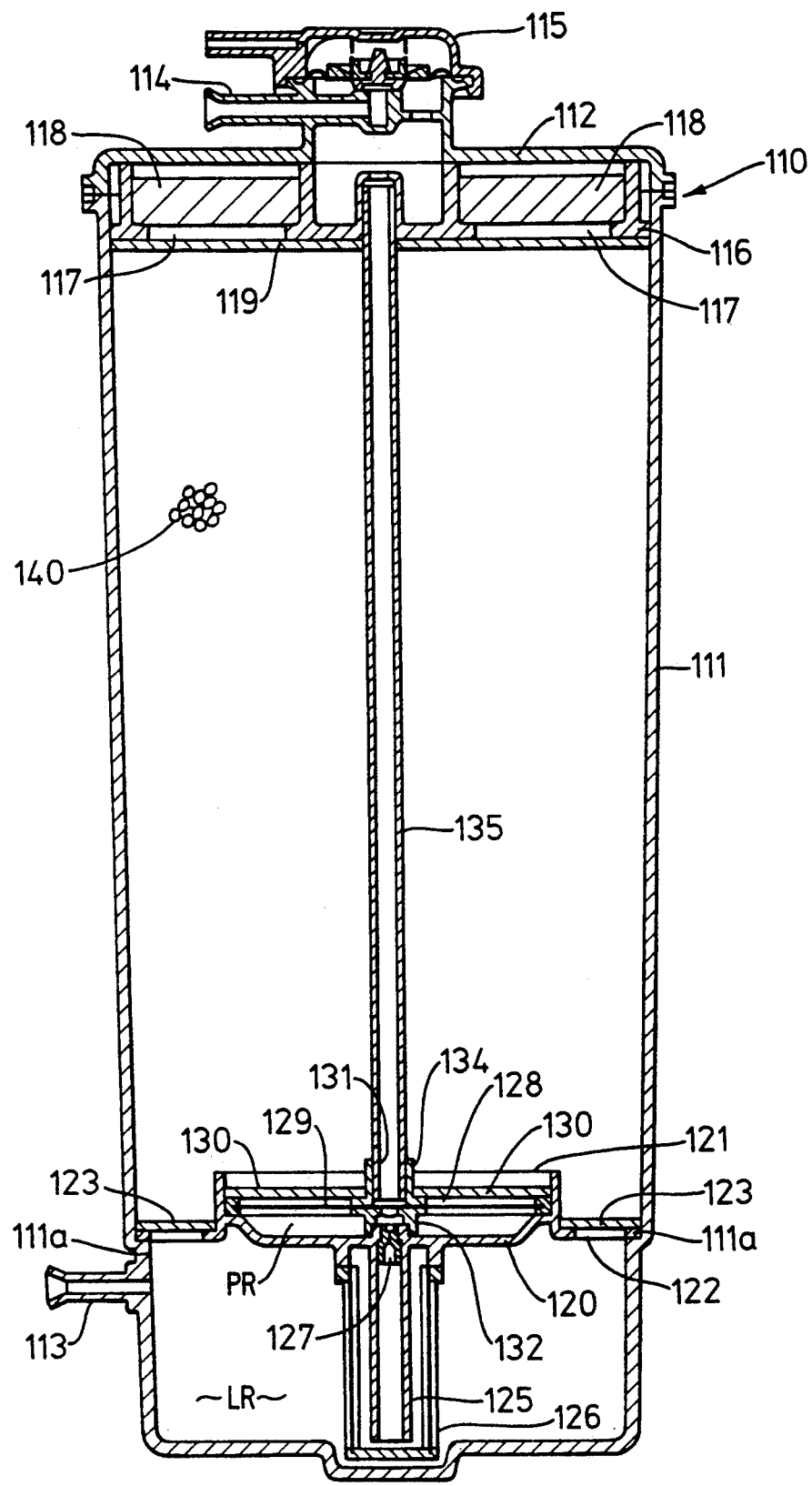
FIG. 5 is a longitudinal sectional view of the canister in accordance with a second embodiment.
Figure 6:
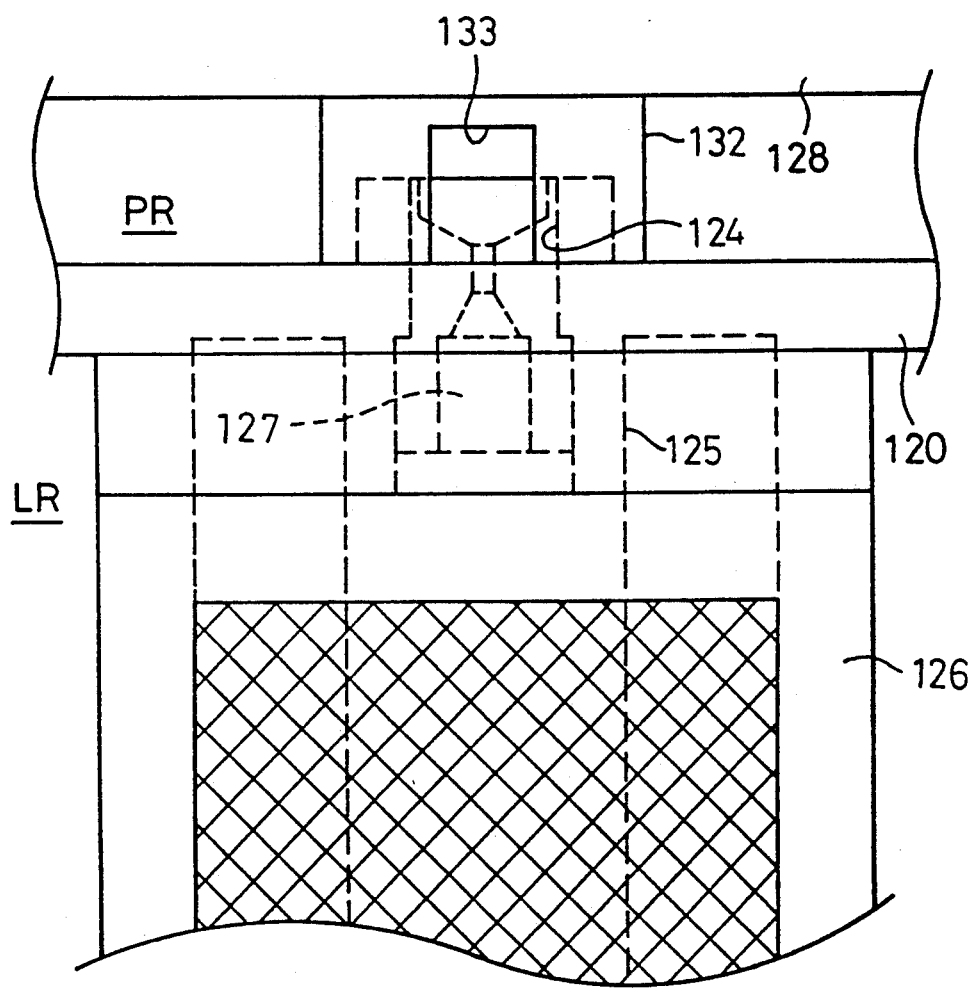
FIG. 6 is a partially enlarged view of the jet and its peripheral portion of the canister.

FIGS. 5 and 6 illustrate the canister of a second embodiment. The casing 110 comprises the cylindrical casing body 111 and the lid 112. The casing body 111 is provided with a partition wall 120 horizontally partitioning the casing interior into upper and lower chambers. The partition wall 120 has an upwardly convex wall 121 circumferentially formed thereon The convex wall 121 partitions the partition wall 120 into the circumferential portion and the central portion. An outside window 122 is circumferentially formed in the outer circumferential portion of the partition wall 120. A gas permeable pad 123 is attached to the outside window 122. A jet hole 124 is formed in the inner circumferential central portion of the underside of the partition wall 120. A liquid fuel outflow pipe 125 extends downwardly from the jet hole 124 to the vicinity of the bottom of the casing body 111. The liquid fuel outflow pipe 125 is enclosed by a strainer 126 having a filtrating screen on the circumferential surface A jet 127 having a central small-diameter nozzle is fitted with the jet hole 124. In the embodiment, the first fuel outflow passage is formed by the jet hole 124, the liquid fuel outflow pipe 125 and the jet 127.

The circumferential edge of the partition wall 120 is placed on a stepped portion 111a formed in the inner circumferential wall of the casing body 111. An inner lid 128 is placed inside the convex wall 121. The inner lid 128 has an outer circumferential configuration same as the inner circumferential configuration of the convex wall 121. The inner lid 128 has a window communicating between the upper chamber and the purge chamber which will be described later. The window is provided with a mesh screen 129. A gas permeable pad 130 is attached to the upper side of the window.

The inner lid 128 has a communication hole 131 formed in the central portion. A suction pipe 132 is downwardly projected from the underside opening of the communicating hole 131. The suction pipe 132 faces the jet hole 124 of the partition wall 120 so as to cover the circumference of the jet hole 124. The suction pipe 132 has in its side a suction opening 133 communicating with a space defined between the partition wall 120 and the inner lid 128. A short cylinder 134 is formed on the upper opening of the communication hole 131. An outflow pipe 135 is mounted on the short cylinder 134 to be extended upwardly along the central axis of the casing body 111. The outflow pipe 135 is closely connected to the short cylinder 134. The second fuel outflow passage is thus formed by the communication hole 131, the suction opening 133, the short cylinder 134 and the outflow pipe 135.

An inflow pipe 113 is provided through the lower side wall of the casing body 111 so as to be positioned below the stepped portion 111a. A flexible pipe (not shown) communicating with the fuel tank is connected to the inflow pipe 113. Another inflow pipe 114 is secured to the lid 112 and is to be connected to the external intake system of the engine. The inflow pipe 114 is connected to the diaphragm valve mechanism 115 operated in response to the negative pressure arising during the running of the engine. When the diaphragm valve mechanism 115 is subjected to the negative pressure, the inflow pie 114 communicates with the underside of the lid 112 and the communication is interrupted when it is not subjected to the negative pressure.

A pressing lid 116 is provided in the casing 110 so that the upper end of the outflow pipe 135 is supported on its central portion. Furthermore, an enclosed chamber is defined between the pressing lid 116 and the underside of the diaphragm valve mechanism 115 so that the upper end of the outflow pipe 135 communicates with the inflow pipe 114 via the enclosed chamber at predetermined times. The pressing lid 116 has a plurality of windows 117 on which filters 118 are disposed respectively. A gas permeable pad 119 is attached to the entire underside of the pressing lid 116.

A space is defined between the gas permeable pads 123, 130 disposed on the partition wall 120 and the gas permeable pad 119 attached to the underside of the pressing lid 116 in the casing 110. This space is filled with activated carbon 140 serving as the adsorbent. The upper face of the activated carbon 140 communicates with the open air via the gas permeable pad 119, the filter 118 and the atmosphere guide hole formed in the lid 112. A small chamber defined by the underside of the partition wall 120 in the lower interior of the casing body 111 will be referred to as liquid fuel reserve well LR and a small space defined between the partition wall 120 and the inner lid 128 as purge chamber PR.

The operation of the canister of the second embodiment will be described. The assembly of the canister will first be described before description of the operation. In assembling the canister, parts to be enclosed in the casing 110 are first assembled with the partition wall 120 as a base part. More specifically, at the underside of the partition wall 120, the jet 127 is inserted into the jet hole 124 and the liquid fuel feed pipe 125 is covered by the strainer 126, which strainer 126 is secured to the underside of the partition wall 120. At the upper side of the partition wall 120, the suction pipe 132 of the inner lid 128 is placed to face the jet hole 124 at the inner circumferential side of the convex wall 121, thereby positioning the suction pipe 132. The inner lid 128 is placed on the partition wall 120 with the suction pipe 132 being positioned. The gas permeable pad 130 is disposed on the inner lid 128 and the gas permeable pad 123 is disposed on the outer circumferential portion of the partition wall 120. Thereafter, the outflow pipe 135 is inserted into the short cylinder 134 of the inner lid 128.

The parts assembled as described above are inserted into the casing 110 in the condition that the outflow pipe 135 is grasped and the strainer 126 is positioned at the lowest. When the outer circumferential end of the partition wall 120 butts against the stepped portion 111a of the casing body 111, a predetermined amount of the activated carbon 140 is put into the casing body 111 with the distal end of the outflow pipe 135 closed in the condition that the partition wall outer circumferential end is placed on the stepped portion 111a. After the casing body 111 is filled with the activated carbon 140, the pressing lid 116 assembled with the gas permeable pad 119 and the filter 118 is inserted into the casing 111 such that the activated carbon 140 is pressed and the upper end of the outflow pipe 135 is held.

The diaphragm valve mechanism 115 is previously assembled with the lid 112. The lid 112 is placed on the casing body 111 after the pressing lid 116 is inserted into the casing body 111. Then, the lid 112 is secured at the circumference to the casing body 111 and the assembly of the canister is completed.

The vapor pressure of the fuel vapor produced in the fuel tank is increased with the rise in the atmospheric temperature. The fuel vapor is then caused to flow with air in the fuel tank into the liquid fuel reserve well LR through the feed pipe 113. The fuel vapor further flows with air into the layer of the activated carbon 140 through the outer window 122 of the partition wall 120 and the gas permeable pad 123. The fuel vapor is adsorbed by the activated carbon 140 and only the air passes through the activated carbon 140 layer to be discharged to the atmosphere from the communication hole of the lid 112 through the gas permeable pad 119 and the filter 118.

The liquid fuel may flow into the fuel reserve well LR through the inflow pipe 113 with the vapor phase fuel vapor according to the circumstances. The liquid fuel is, however, reserved in the liquid fuel reserve well LR without penetrating into the activated carbon 140 layer.

Upon start of the running of the engine, the diaphragm valve mechanism 115 is operated in response to the negative pressure caused in the intake system of the engine so that the outflow pipe 135 communicates with the outflow pipe 114. Since the outflow pipe 114 is connected to the intake system, the negative pressure caused in the intake system is exerted on the interior of the outflow pipe 135 and on the interior of the purge chamber PR communicating with the outflow pipe 135 through the suction opening 133. The negative pressure from the intake system is further exerted on the underside of the activated carbon 140 layer since the purge chamber PR communicates with the underside of the activated carbon 140 layer through the mesh screen 129 and the gas permeable pad 130. Consequently, the open air is sucked into the casing 110 through communication hole of the lid 112 and further into the purge chamber PR through the layer of the activated carbon 140. In this case, since the air removes the fuel vapor from the activated carbon 140 when it passes through the layer of the activated carbon 140, the air containing the fuel vapor is sucked into the outflow pipe 114 from the outflow pipe 135 through the suction opening 133.

The air containing the fuel vapor flows through the suction opening 133 when sucked into the outflow pipe 135 from the purge chamber PR. The jet hole 124 is provided in this flow passage and the jet 127 with the small-diameter nozzle is inserted in the jet hole 124. Accordingly, the negative pressure arises over the jet 127 facing the flow passage at one end as the velocity of flow of the air is increased. The jet 127 communicates, at the other end, with the bottom of the liquid fuel reserve well LR through the liquid fuel outflow pipe 125. Consequently, when the liquid fuel is reserved in the liquid fuel reserve well LR and the negative pressure arises over the jet 127, the liquid fuel reserved in the liquid fuel reserve well LR is sucked through the liquid fuel outflow pipe 125. The liquid fuel is not sucked into the outflow pipe 135 when an amount of the negative pressure is below a predetermined value. The liquid fuel is sprayed into the outflow pipe 135 when the amount of the negative pressure is increased to the predetermined value or above. The quantity of the liquid fuel passing through the jet 127 is limited even when the negative pressure is increased to a large value. Thus, a large quantity of liquid fuel can be prevented from being rapidly supplied to the intake system of the engine.

On the other hand, the negative pressure in the outflow pipe 135 is exerted on the liquid fuel reserve well LR through the jet 127 when the liquid fuel is not reserved in the liquid fuel reserve well LR. However, since the diameter of the suction opening 133 is sufficiently larger than the diameter of the nozzle of the jet 127, the negative pressure is exerted on the purge chamber PR such that the suction force is directed to the interior of the purge chamber PR. Furthermore, the negative pressure exerted on the purge chamber PR also acts so that the suction is directed to the interior of the liquid fuel reserve well LR through the activated carbon 140 layer. However, the fuel vapor fed from the fuel tank through the inflow pipe 113 flows into the layer of the activated carbon 140 at least from the liquid fuel reserve well LR through the outer window 122 of the partition wall 120 and further flow to the inner lid 128 through a part of the activated carbon 140 layer. Consequently, the fuel vapor fed from the fuel tank and unsuitable for the fuel control can be prevented from being directly supplied to the intake system without passing through the adsorbent layer. Additionally, the flow passage of the liquid fuel can be adjusted by changing the height of the convex wall 121.

Figure 7:
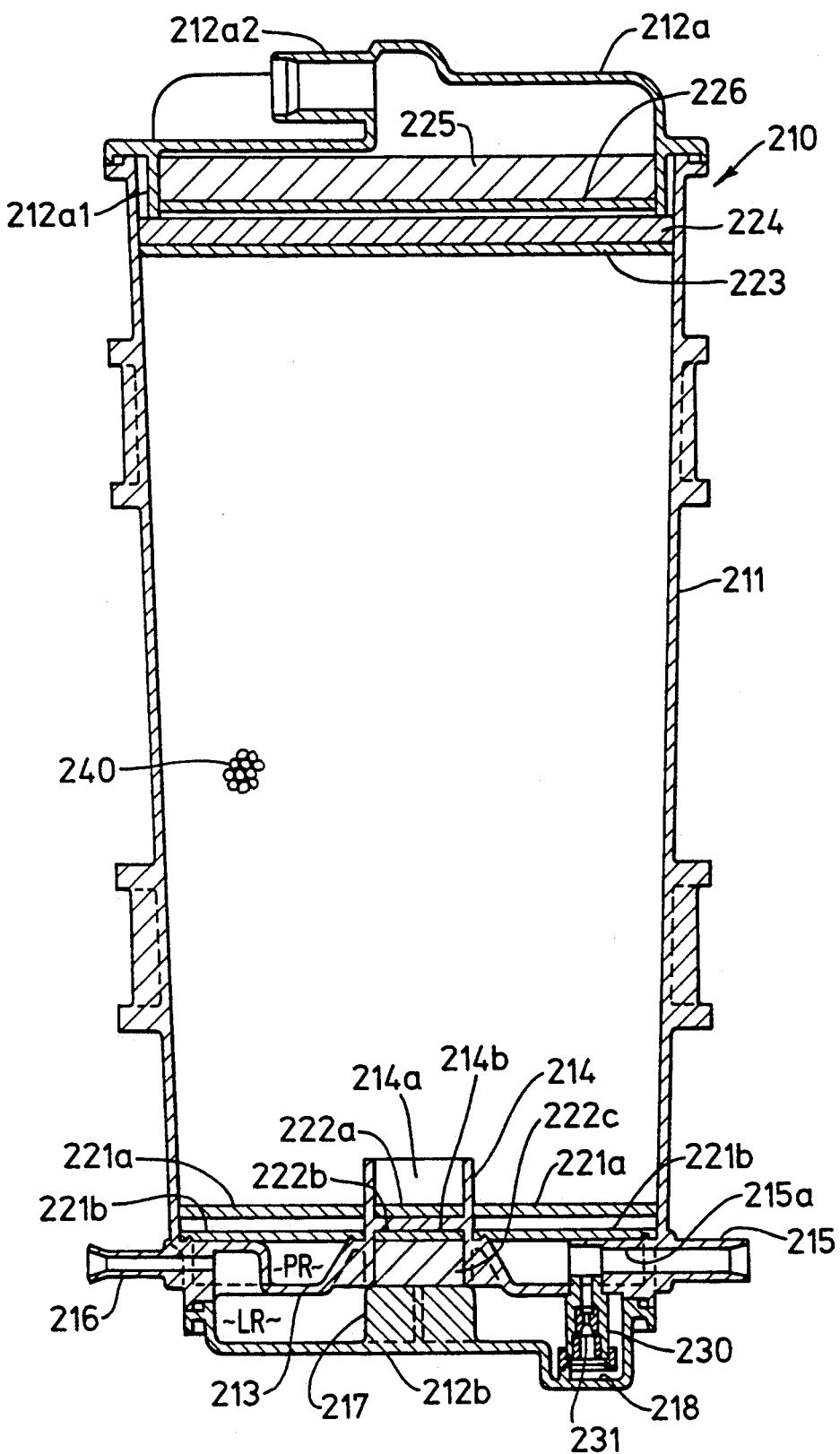
FIG. 7 is a longitudinal sectional view of the canister in accordance with a third embodiment.
Figure 8:
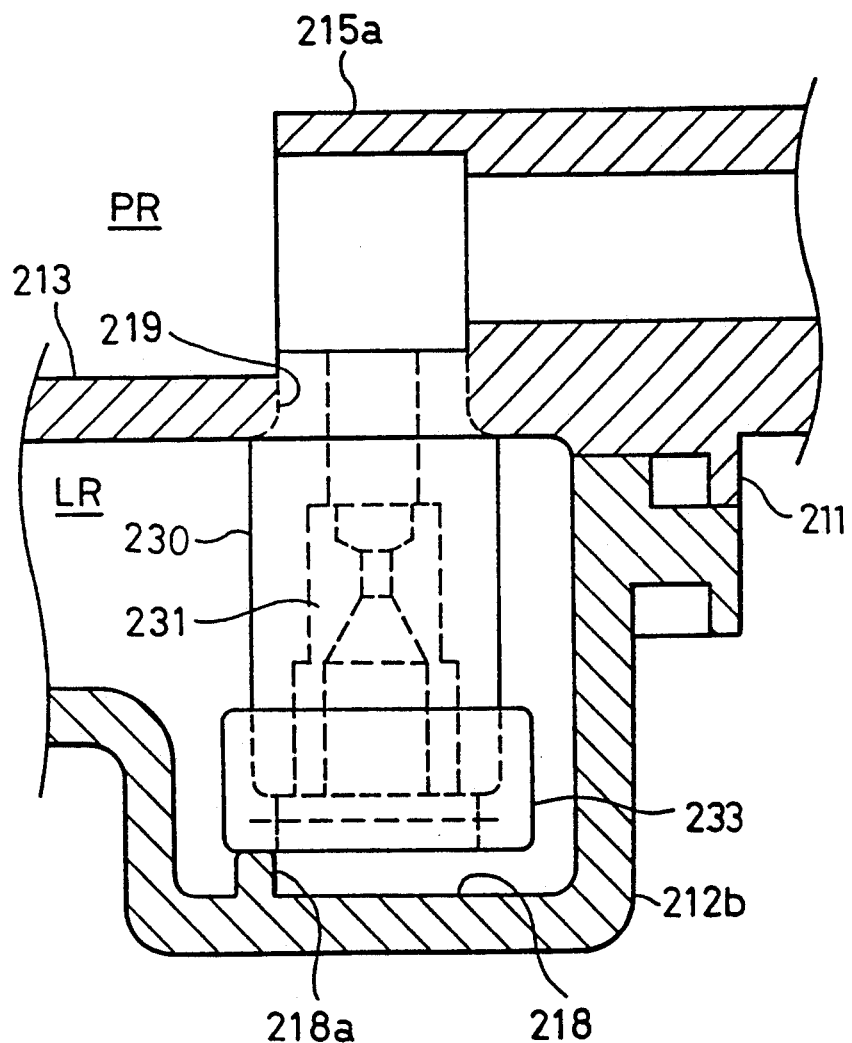
FIG. 8 is a partially enlarged view of the jet and its peripheral portion of the canister.

FIGS. 7 and 8 illustrate the canister of a third embodiment. Referring to FIG. 7, the casing 210 of the canister comprises the casing body 211, upper lid 212a and bottom lid 212b. The bottom wall 213 of the casing body 211 has concave and convex portions. A communication hole 214a is formed in the central portion of the bottom wall 213. The communication hole 214a is surrounded by a cylindrical wall 214. An outflow pipe 215 is provided through the lower side wall of the casing body 211 so as to communicate with the interior of the casing body 211 and so as to be opposite to the concave portion of the bottom wall 213. Furthermore, an inflow pipe 216 is provided through the lower side wall of the casing body 211 so as to communicate with the underside space of the casing body 211 and so as to be opposite to the convex portion of the bottom wall 213.

An annular gas permeable pad 221 comprising portions 221a and 221b is disposed on the bottom wall 213. The purge chamber PR is defined between the gas permeable pad 221 and the bottom wall 213. A communicating portion 214b having a number of small apertures is formed at the inner middle portion of the cylindrical wall 214. A gas permeable pad 222a is disposed on the upper side of the communicating portion 214b. Another gas permeable pad 222b is disposed on the underside of the communicating portion 214b and a filter 222c is disposed on the underside of the gas permeable pad 222b.

A bottom lid 212b is secured to the bottom of the casing body 211 so that the circumferential edge of the bottom lid 212b is closely adjacent to the bottom edge of the casing body 211, thereby forming the liquid fuel reserve well LR in the lower interior of the casing body 211. A cross-shaped convex portion 217 is formed on the upper side of the bottom wall 212b so as to abut against the filter 222c disposed under the gas permeable pad 222b. The bottom lid 212b has a slightly deeper bottom portion 218 under the outflow pipe 215. A communicating hole 219 is formed in a portion of the bottom wall 213 corresponding to the deeper bottom portion 218, as shown in FIG. 8. A cylindrical jet holding member 230 is provided in the deeper bottom portion 218 so as to extend to the communicating hole 219. A jet 231 having a small-diameter nozzle with a small diameter is fitted in the cylindrical jet holding member 230. A cover member 215a is disposed to be adjacent to the gas permeable pad portion 221b and to be opposed to an upper opening of the jet holding member 230. The cover member 215a communicates with the outflow pipe 215 to thereby form a flow passage. A strainer 233 having a mesh screen is provided so as to cover the lower opening of the jet holding member 230 and so as to be adjacent at one side to a projection 218a formed on the deeper bottom portion 218. In the state that the strainer 233 is provided as described above, the jet holding member 230 is floated from the deeper bottom portion 218 and pressed against the communicating hole 219. In the embodiment, the first fuel outflow passage comprises the jet holding member 230, the jet 231 and the strainer 233 and the second fuel outflow passage comprises the cover member 215a and the outflow pipe 215.

The interior of the casing body 211 is filled with the activated carbon 240. The gas permeable pad 223 is disposed on the upper face of the layer of the activated carbon 240 and a pressing plate 224 is disposed on the gas permeable pad 223. The upper lid 212a has a cylindrical portion 212a1 projected to the interior of the casing body 211. The communicating hole 212a2 communicating with the atmosphere is formed on the upper portion of the upper lid 212a. A filter 225 with a filter holding member 226 is provided in the cylindrical portion 212a1 so as to cover the entire flow passage communicating with the interior of the casing body 211 through the communicating hole 212a2. The upper lid 212a is air-tightly attached to the upper open end of the casing body 211.

The operation of the canister of the third embodiment will be described. The assembly of the canister will first be described before description of the operation. In assembling the canister, the jet 231 having a predetermined diameter is inserted into the jet holding member 230 and the lower opening of the jet holding member 230 is covered by the strainer 233. The casing body 211 is turned upside down and then, the jet holding member 230 holding the jet 231 is inserted into the communicating hole 219. Then, the gas permeable pad 222b and the filter 222c are inserted into the lower side interior of the cylindrical wall 214. The bottom lid 212b is secured to the lower portion of the casing body 211.

The casing body 211 is then returned to its usual state. The gas permeable pads 221a, 221b are disposed on the bottom wall 213 and the gas permeable pad 222a is disposed in the cylindrical wall 214. Then, a predetermined amount of activated carbon 240 is put into the casing body 211. The gas permeable pad 223 and the pressing plate 224 are disposed on the upper face of the layer of the activated carbon 240 after completion of the filling of the casing body 211 by the activated carbon. The assembly of the canister is thus completed.

The vapor pressure of the fuel vapor produced in the fuel tank is increased with the rise in the atmospheric temperature. The fuel vapor is then caused to flow with air in the fuel tank into the liquid fuel reserve well LR through the feed pipe 216. The fuel vapor further flows with air into the layer of the activated carbon 240 sequentially through the filter 222c, the gas permeable pad 222b, the communicating portion 214b and the gas permeable pad 222a. The fuel vapor is adsorbed by the activated carbon 240 and only the air passes through the activated carbon 240 layer to be discharged to the atmosphere from the communication hole 212a2 of the upper lid 212a sequentially through the gas permeable pad 223, the pressing plate 224, the filter holding member 226 and the filter 225.

Upon start of the running of the engine, the negative pressure caused in the intake system is transferred to the interior of the purge chamber PR through the outflow pipe 215 and the cover portion 215a in turn. Since the purge chamber PR communicates with the underside of the activated carbon 240 layer through the gas permeable pads 221a, 221b, the negative pressure caused in the intake system is exerted on the underside of the activated carbon 240 layer. As a result, the atmosphere is sucked into the casing 210 through the communication hole 212a2 of the upper lid 212a and further sucked into the purge chamber PR after passing through the activated carbon 240 layer. The adsorbed fuel vapor is removed from the activated carbon 240 when the atmosphere passes through the layer of the activated carbon 240, and accordingly, the air containing the removed fuel vapor is sucked into the outflow pipe 215 through the cover portion 215a.

In this embodiment, the air containing the fuel vapor flows through the cover member 215a provided over the upper opening of the jet holding member 230 when sucked into the outflow pipe 215 from the purge chamber PR. Accordingly, the negative pressure arises in the jet holding member 230 as the velocity of flow of the air is increased. The liquid fuel reserved in the liquid fuel reserve well LR is not sucked over the jet 231 when the amount of the negative pressure is below the predetermined value. However, the fuel liquid is sucked into the jet 231 and sprayed into the cover member 215a from the nozzle of the jet 231 when the amount of negative pressure is increased to the predetermined value or above.

In the embodiment, too, the negative pressure in the outflow pipe 215 is transferred to the interior of the liquid fuel reserve well LR through the jet 231 when the liquid fuel is not reserved in the liquid fuel reserve well LR. However, since the diameter of the cover member 215a is sufficiently larger than the diameter of the nozzle of the jet 231, the negative pressure is exerted on the purge chamber PR such that the suction force is directed to the interior of the purge chamber PR.

Furthermore, the negative pressure exerted on the purge chamber PR also acts so that the suction is directed to the interior of the liquid fuel reserve well LR through the activated carbon 240 layer. However, the fuel vapor fed from the fuel tank through the inflow pipe 216 flows into the layer of the activated carbon 240 at least from the liquid fuel reserve well LR through the communicating hole 214a of the cylindrical wall 214 provided on the central upper face of the bottom wall 213 and further flows into the purge chamber PR sequentially through a part of the activated carbon 240 layer and the gas permeable pads 221a, 221b. Consequently, the fuel vapor fed from the fuel tank and unsuitable for the fuel control can be prevented from being directly supplied to the intake system without passing through the adsorbent layer. Additionally, the flow passage of the liquid fuel can be adjusted by varying the height of the cylindrical wall 214.

When flowing into the activated carbon 240 layer from the liquid fuel reserve well LR, the fuel vapor upwardly flows into the activated carbon 240 layer, gradually spreading from the central portion of the underside of the layer to the circumferential portion thereof. On the other hand, when sucked into the purge chamber PR through the activated carbon 240 layer, the air containing the fuel vapor flows into the layer from the peripheral portion of the underside thereof. Consequently, the layer of the activated carbon 240 can be used uniformly and efficiently.

Figure 9:
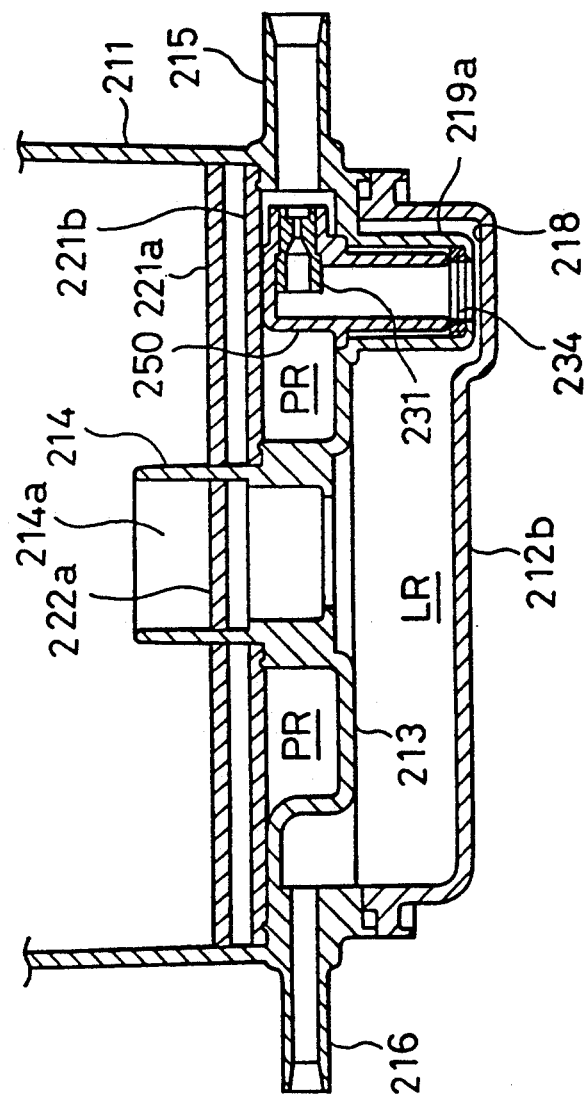
FIG. 9 is a longitudinal sectional view of the bottom of the canister in accordance with a fourth embodiment.

FIG. 9 illustrates the canister of a fourth embodiment wherein the shape of the jet holding member is modified. The jet holding member 250 has an elbow-shaped upper portion bent by 90 degrees. A cylindrical pocket 219a extending toward the deeper bottom portion 218 is employed instead of the communicating hole 219 of the bottom wall 213. The cover portion 215a employed in the foregoing embodiment is eliminated and the outflow pipe 215 is open to the lower inner side face of the casing body 211. Furthermore, the strainer 234 is formed into the shape of a disc having the same diameter as the jet holding member 250.

The jet 231 is inserted into the jet holding member 250 from the upper opening thereof. The strainer 234 is inserted into pocket 219a from the inside of the casing body 211 and then, the jet holding member 250 is inserted into the pocket 219a so as to be positioned on the strainer 234, whereby a convex portion formed along the middle outer circumferential wall of the jet holding member 250 is fitted with a concave portion formed along the upper edge of the pocket 219a such that the jet holding member 250 is fixed.

The upper opening of the jet holding member 250 is positioned to face the opening of the feed pipe 215 in close vicinity thereto. The fuel vapor flows from the purge chamber PR into the space between the openings of the jet holding member 250 and the feed pipe 215 when the suction force is applied to the interior of the purge chamber PR through the outflow pipe 215. Consequently, the negative pressure is caused in the opening of the jet 231 facing the above-described flow passage as in the forgoing embodiment such that the fuel liquid reserved in the deeper bottom portion 218 is discharged.

The foregoing disclosure and drawings are merely illustrative of the principles of the present invention and are not to be interpreted in a limiting sense. The only limitation is to be determined from the scope of the appended claims.

We claim:
1. A canister comprising:
 a) a casing;
 b) a fuel reserve well formed by the bottom of the casing, the fuel reserve well having an inlet communicating with a fuel system of an engine and a vapor port;
 c) an adsorbent layer provided in the casing for adsorbing fuel vapor, the fuel reserve well communicating with a region of the lower portion of the adsorbent layer through the vapor port, the adsorbent layer communicating with an atmosphere at the upper portion thereof; and
 d) a purge chamber provided between the adsorbent layer and the fuel reserve well, the purge chamber having an outlet communicating with an intake system of the engine and a purge port communicating with a region of the lower portion of the adsorbent layer other than the region of the lower portion thereof with which the fuel reserve well communicates.

2. A canister comprising:
 a) a casing;
 b) a fuel reserve well defined in the bottom of the casing, the fuel reserve well having an inlet communicating with a fuel system of an engine and a vapor port;
 c) an adsorbent layer provided in the casing for adsorbing fuel vapor, the fuel reserve well communicating with a region of the lower portion of the adsorbent layer through the vapor port, the adsorbent layer communicating with an atmosphere at the upper portion thereof;
 d) a purge chamber provided between the adsorbent layer and the fuel reserve well, the purge chamber having an outlet communicating with an intake system of the engine and a purge port communicating with a region of the lower portion of the adsorbent layer other than the region of the lower portion thereof with which the fuel reserve well communicates; and
 e) a liquid fuel suction port communicating between the purge chamber and the fuel reserve well.

3. A canister of claim 2, further comprising a nozzle provided in the liquid fuel suction port.

4. A canister of claim 2, wherein the purge chamber faces a region of the underside circumferential edge portion of the adsorbent layer other than the region which the fuel reserve well faces.

5. A canister of claim 2, wherein the fuel reserve well and the purge chamber are partitioned by a wall.

6. A canister of claim 5, wherein the inlet of the fuel reserve well directly communicates with the interior of the fuel reserve well through a side wall of the casing.

7. A canister of claim 2, wherein the liquid fuel suction port is disposed at a lowermost point of the fuel reserve well.

8. A canister of claim 2, wherein the vapor port is centrally disposed below the adsorbent layer and has a generally cylindrical shape.

9. A canister of claim 8, wherein the purge chamber has an annular shape and surrounds the vapor port.

10. A canister of claim 9, wherein the outlet of the purge chamber directly communicates with the purge chamber through the side wall of the casing.

* * * * *